United States Patent [19]
Nix et al.

[11] 3,902,864
[45] Sept. 2, 1975

[54] COMPOSITE MATERIAL FOR MAKING CUTTING AND ABRADING TOOLS

[75] Inventors: Joy R. Nix, Fort Worth, Tex.; Michael R. Sargent, Raleigh, N.C.; William T. Kaarlela, Forth Worth, Tex.

[73] Assignee: General Dynamics Corporation, Forth Worth, Tex.

[22] Filed: Apr. 17, 1972

[21] Appl. No.: 244,913

Related U.S. Application Data

[62] Division of Ser. No. 54,030, June 3, 1970, abandoned, which is a division of Ser. No. 723,657, April 24, 1968, Pat. No. 3,590,472.

[52] U.S. Cl. ............ 29/191.2; 29/182.5; 29/195 A
[51] Int. Cl.² ........................................... B23P 3/00
[58] Field of Search............ 29/191.2, 191.4, 182.5; 51/296, 298; 30/345

[56] References Cited
UNITED STATES PATENTS

| | | | |
|---|---|---|---|
| 3,256,072 | 6/1966 | Bull et al. | 29/191.2 X |
| 3,419,952 | 1/1969 | Carlson | 29/191.4 X |
| 3,427,185 | 2/1969 | Cheatham et al. | 29/191.4 X |
| 3,476,529 | 11/1969 | Dubin et al. | 29/191.2 X |
| 3,495,960 | 2/1970 | Schladitz | 51/298 |
| 3,529,945 | 9/1970 | Charvat | 51/296 X |

Primary Examiner—L. Dewayne Rutledge
Assistant Examiner—O. F. Crutchfield
Attorney, Agent, or Firm—Charles E. Schurman; John R. Duncan; Charles C. M. Woodward

[57] ABSTRACT

A super-indurate, texturally stable abrasive composite material useful in the making of cutting and abrading tools, such as oil-well drills, industrial metal cutting bits, mills, planer knives and abrasive grinders. The superficies of the object tool is comprised of the outer face of a tough matrix material and the projecting ends of a preferentially oriented indurate fibers or filaments, such as boron or the indurate inter-metallic compounds of boron endowed with a hardness closely approaching that of industrial diamonds, which have been dispersed in collocated array and embodied within a tough matrix material such, for example, as in a sponge iron matrix which has been briquetted in the configuration of the object tool and then heated at temperatures sufficient for incipient fusion to occur to form the composite tool. Other ductile metals such as aluminum, nickel and cobalt, including certain of their alloys, together with steel and titanium are further examples of matrix materials which may be employed. The indurate filaments are so dispersed and collocated that the outer ends of the fibers or filaments are aligned normal to the tool's work-taction surface and consequently to the surface of the object material to be cut or abraded.

5 Claims, 18 Drawing Figures

COMPOSITE MATERIAL FOR MAKING CUTTING AND ABRADING TOOLS

This is a division of application Ser. No. 54,030 filed June 3, 1970, now abandoned, which was a division of application Ser. No. 723,657, filed Apr. 24, 1968, now U.S. Pat. No. 3,590,472.

The present invention relates generally to a very hard composite material for cutting or abrading hard and obdurate substances and the methods of forming the composite. More particularly the invention relates to a novel and unique material combination referred to herein as a super-indurate composite structure which can be readily fabricated into useful and efficient tool shapes for the cutting or abrading of very hard substances such as the most obdurate metals, rock, other lapideous matter and the like. Such cutting and abrading tools may be any of several varieties having either rotary or planar cutting or abrading action such as end mills, boring mill cutters, drills, augers, planing mill cutters, lathe cutters, turning mill cutters, abrasive discs, grinding or polishing wheels and the like. Further examples include oil-well rock bits, roller bits, coring bits and similar geological boring and scraping tools.

In the present art and with particular reference to the petroleum industry and related geological activities, many types of drill bits are presently being employed. Hardened tool-steel bits and carbide insert cutters are in widespread use for general drilling through low and medium hardness geological formations. Diamond tipped bits are employed when penetration of very hard, lapidified formations is desired. Several disadvantages are inherent in the use of separate cutting, boring and abrasive tools of the known art. Drilling oil wells requires the use of different bits when passing through the changing geological formations and therefore the long articulated drill stem must be pulled from the hole, disassembled in sections and stacked until the entire length is withdrawn and the cutting bit changed, before proceeding into the next formation. This is a slow, laborious and very costly procedure which must be repeated many times during the course of drilling a well. This is particularly true in off-shore drilling because of the extreme depths of the wells.

Further, the commonly used hardened tool steels employed in making such drills wear out very rapidly, also requiring the costly pull-out operation described above, to permit the drill bit to be replaced. Rock drills having cemented-on tips of industrial diamonds become unusable when the diamond chips become loosened or disengaged from the drill bit's face, again requiring costly pull-out of the entire stem system and replacement of the bit.

High-speed steel, from which the efficient design of the well known general purpose roller bit is made, wears very rapidly when this bit is employed for drilling in very hard formations, thus requiring pull-out of the drill stem in order to make the change to a diamond studded hard rock bit, which, from necessity is limited to a relatively inefficient pestle-like design. With the present invention, a roller bit of the same general configuration as those presently employed, but having its roller teeth fabricated from the present super-indurate composite material has the dual capability of serving as an efficient all-purpose drill bit, thus retaining the efficiency of the roller bit configuration yet also attaining the effectivity of the diamond studded-hard rock bit for drilling in the very hard formations. Thus, the present invention permits continuous drilling without pull-out for bit change when passing from one formation to the other.

Industrial metal-working milling tools, grinders, boring bits, drills, sanders and the like also wear very rapidly when the harder metals such as tungsten, tantalum, titanium, molybdenum, the high carbon steels, etc. are machined or ground with abrasive tools and also in some of the more advanced steel alloys such as D6ac, martensitic stainless, maraging steel, and H-11 tool steel.

The presently invented composite material effectively obviates most of the above described deficiencies and disadvantages inherent in the use of cutting and abrading tools of the present art by providing a very economical, easy to manufacture, super-indurate composite material for the making of such tools. Super-indurate fibers and filaments are defined for purposes of this disclosure as having a hardness in the range of 9.3–9.99 inclusive, on the Mohs' hardness scale for inorganic materials.

It is an object of the present invention to provide a super-indurate composite material for the manufacture of cutting and abrading tools.

Another object of the invention is to provide a super-indurate composite material for the manufacture of cutting and abrading tools which has an exceptionally long wear life in respect to that of conventional tools employed for similar purposes.

Other and further objects and advantages of the invention will be more readily apparent to those skilled in the art upon a consideration of the appended drawings and the following description wherein several constructional forms of the invention are disclosed, and wherein:

Figure 1:
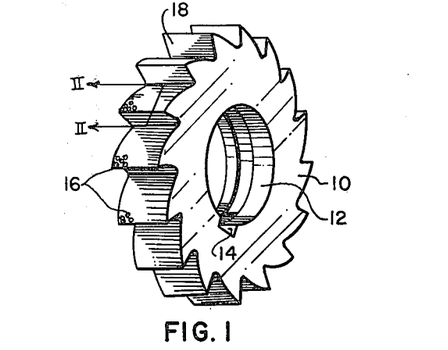
FIG. 1 is an isometric view of a milling cutter embodying the present invention.

Referring now to FIG. 1 of the drawings, there is shown an industrial straight-tooth, plane milling cutter of conventional configuration for metal working having a matrix 10, a bore 12 and key-way 14 for conventional mounting on a mill arbor (not shown). Such milling cutters are usually mae of forged, high-speed, homogeneous steel and are therefore subject to progressive dulling and wear by attrition of the cutting edge when used for milling other hard metals and like substances. Hence only a comparatively short wear-life is realized in the use of such homogeneous metal tools.

Figure 2:
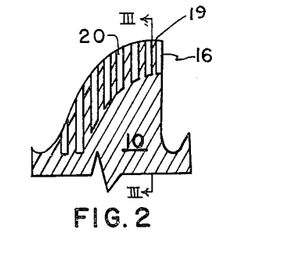
FIG. 2 is an enlarged sectional detail view in elevation of a typical cutting tooth taken at II—II in the cutter shown in FIG. 1.
Figure 3:
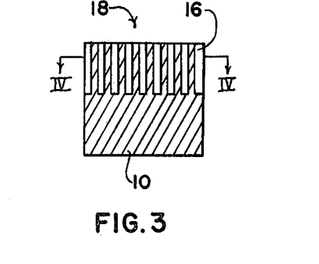
FIG. 3 is a cross-sectional elevational view of the milling cutter tooth taken at line III—III of FIG. 2.
Figure 4:
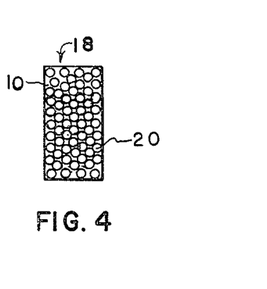
FIG. 4 is a sectional plan view near the cutting edge of the milling cutter tooth as taken at line IV—IV in FIG. 3.

In the present invention a tough yet ductile matrix metal 10, such as iron, aluminum, steel, nickel, cobalt and the like embodies preferentially orientated, aligned and collocated boron or other discrete fibers of filaments 16, dispersed within cutting teeth 18 in such manner that the outer face of the cutting portion or cutting face 19 of the tooth is comprised of the projecting ends 20 of the filaments and the intimately interspersed matrix material 10. This is better illustrated in FIGS. 2, 3 and 4 wherein cutting tooth 18 is shown enlarged for clarity, as is the dispersion of boron filaments 16 or other super-indurate filaments within matrix material 10, to form cutting tooth 18 from the super-indurate composite material of the invention in lieu of homogeneous high speed steel or other conventional metals from which such milling cutters are normally formed in the present art.

The preferred process for making the above described plain, straight-tooth milling cutter may be generally referred to as a modified cold slurry extrusion process. For example, a pre-determined amount of sponge iron powder is mechanically mixed into a hopper containing an aqueous solution having a deflocculant to suspend it in a dispersed state. Boron filaments of selected length and quantity are then admixed into this aqueous solution to form a slurry. The resultant viscous fluid slurry is then cold extruded through an orifice having a ratio of 14:1 or greater to the hopper diameter into a permeable mold or die of the object milling cutter's configuration, thus molding the slurry into the desired size and shape of the tool while simultaneously collocating and otherwise selectively orienting the boron fibers in the desired pattern by the resultant fluid dispersion as the slurry enters the die.

The wet-mold composite form is then dried in a drying oven or otherwise dehydrated by exposing it to drying heat in order to evaporate and drive out substantially all water and moisture. The molded composite milling cutter is next sintered by subjecting it to a temperature sufficient only to permit incipient fusion to occur throughout the granular constituency of the composite's matrix and metallic substrata, resulting in a finished mill cutter with a super-indurate composition for each of its cutting teeth.

Figure 5:
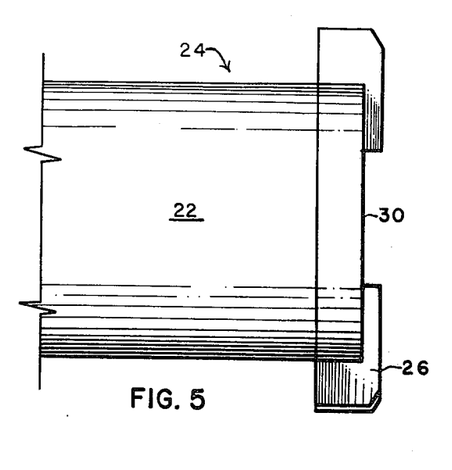
FIG. 5 is a side elevational view of the metal cutting end of a boring bar with typical cutting inserts affixed in their cutting position.
Figure 6:
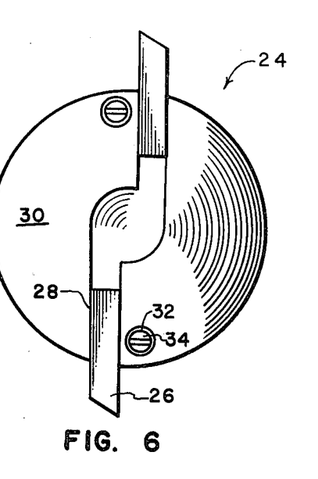
FIG. 6 is an end view from the front of the boring bar of FIG. 5.
Figure 7:
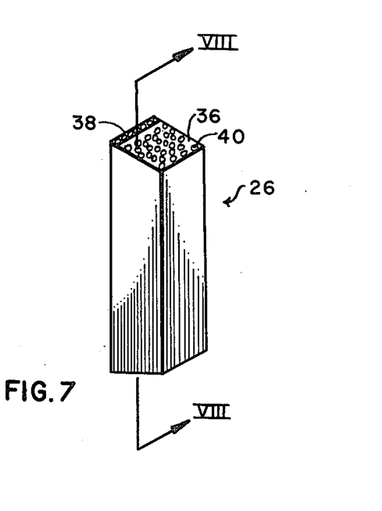
FIG. 7 is an enlarged detail isometric view of one of the cutting inserts shown in FIGS. 1 and 2.

Referring now to FIG. 5, there is shown the lower portion or cutting head 22 of a boring bar 24 of conventional configuration and having dual insert type cutters 26, also of conventional American Standard configuration. Cutters 26, as best seen in FIG. 6, are fitted into retainer slots 28 of bar end 30 and fixedly held in position by flattened bushings 32 and screws 34 inserted at an angle to secure a wedging effect. For purposes of clarity, an enlarged detail of one of the insert cutters 26 is shown in FIG. 7. Dispersed in a collocated pattern within matrix material 36 and extending across the superficies of the cutting end 38 thereof are the projecting ends 40 of a plurality of boron super-indurate filaments 42, FIG. 8. Preferably fibers 42 are spaced one diameter or less apart in order to achieve a desired dispersal density of about 30% by volume or greater of filament ends to matrix material exposure in any given surface to be employed for cutting or abrasion.

Figure 8:
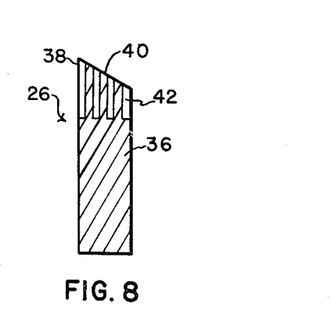
FIG. 8 is a sectional view through the cutting insert taken at line VIII—VIII of FIG. 7 and particularly showing boron filaments, in collocated and aligned array embodied within a metal matrix according to the present invention to provide a super-indurate composite material for the cutting portion of the insert.

The preferred process for fabricating the type of insert cutter exemplified by the above described boring bar cutter may be generally referred to as a modified dry-powder metallurgical process wherein pre-determined proportions of boron filaments of selected length, or other super-indurate fibers are funneled through a first hopper, preferably of the 14:1 ratio described above, onto a trough-like receptacle whose base defines an inclined plane. From a second hopper a pre-determined proportionate amount of metal matrix granules or powder, such as sponge iron, is simultaneously funneled onto the inclined trough and admixed with the deposited filaments as a result of a vibratory motion imparted to the inclined trough by conventional means (not shown). This vibration causes a pre-determined, proportionate mixing of the filaments with the matrix powder, on the order of approximately 30%, or greater, by volume, of filaments to matrix material, while also causing the dry mixture to flow or slide evenly down the inclined plane of the trough and to be deposited into a die cavity formed by a depression, of the size and shape desired, in the floor of the inclined chute. The boron filaments are dispersed and longitudinally aligned in the desired collocated pattern by passing the dry mixture through one or more funnel flues or gates mounted upon the trough, athwart the flow path of the mixture and upon the inclined plane above the die cavity. The die cavity, when full, is subjected to compaction by conventional means, such as by mechanical presses or by the known isostatic pressing process sufficient to cause the dry powder and filament mixture to coalesce into a briquette of the desired dimensions and configuration. This briquette is then sintered by subjecting it to a temperature sufficient only for incipient fusion to occur between its metallic granules, resulting in a permeant encasement of the aligned and collocated boron strands into the sintered powder matrix to form the object insert into a super-indurate composite structure.

Figures 9, 10:
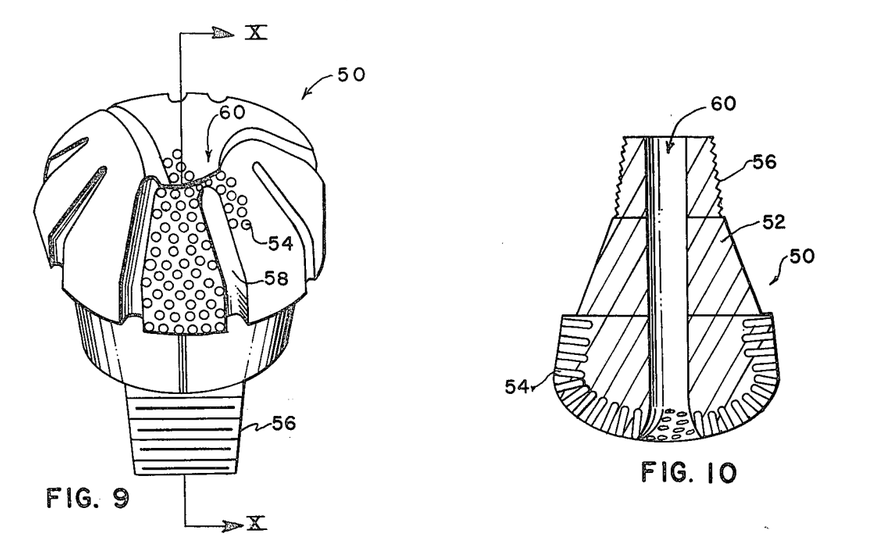
FIG. 9 is a pictorial view of a detachable oilwell hardrock bit of conventional configuration embodying the super-indurate composite material of the present invention in lieu of forged steel having industrial diamonds adhered to its cutting face as in the present practice in conventional devices having this configuration and for this purpose.
FIG. 10 is a cross-section elevational view of the bit of FIG. 9 taken along line X—X of FIG. 9.

The pestle-shaped hard-rock bit 50, shown in FIGS. 9 and 10, is presently employed in geological drilling, particularly in the petroleum industry for drilling through very hard formations, and is also exemplary of the type of abrasive cutting tool whose working superficies may be readily fabricated from the super-indurate composite material of the present invention. Conventionally, the working face of this bit is studded with industrial diamonds which are cemented or otherwise adhered to the work taction surface by a very strong adhesive. This diamond studded face serves as the abrading medium for drilling through rock formations or other very hard geological substances.

The present invention integrally combines the conventional hardened tool steel 52 employed in this hard rock bit design with work taction superficies of super-indurate composite material 54 to provide a bit which does not need to be withdrawn from the hole. The advantage obtained in the use of boron and other super-indurate fibers 54 in a tough matrix 52 to provide a working face composite as a direct replacement for cemented diamond chips is obvious since they cannot be pulled out, dislodged or otherwise degraded by hard use because of their firmly embedded length. Other portions of the tool 50, such as the threaded shank portion 56 as well as its general configuration, including relief channels 58 and drilling fluid orifice 60 remain consistent with those of the conventional diamond studded bit.

This bit, when fabricated to embody a work surface of super-indurate composite material is made by the closed cavity hot extrusion process described above but employing two phases in the process. In the first phase a cylindrical super-indurate composite having a central bore therethrough and with its filaments oriented and collocated in a longitudinal direction is formed by the modified cold slurry extrusion process hereinabove described. From this cylindrical shape a washer-like disc segment having a thickness as required to effect the super-indurate working face of the bit is removed or in effect sliced from the parent extrusion.

Figure 11:
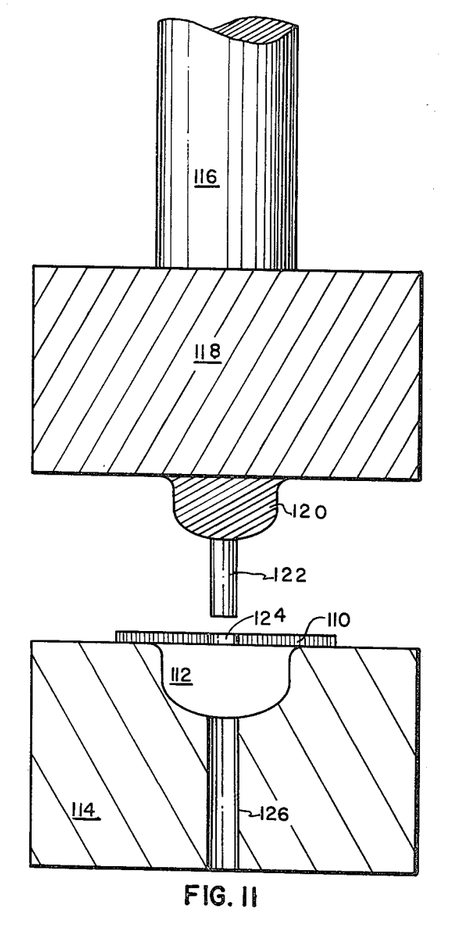
FIG. 11 is a cross-sectional elevational view of an open punch press showing a disc of super-indurate composite material placed over the press die concavity prior to forming.
Figure 12:
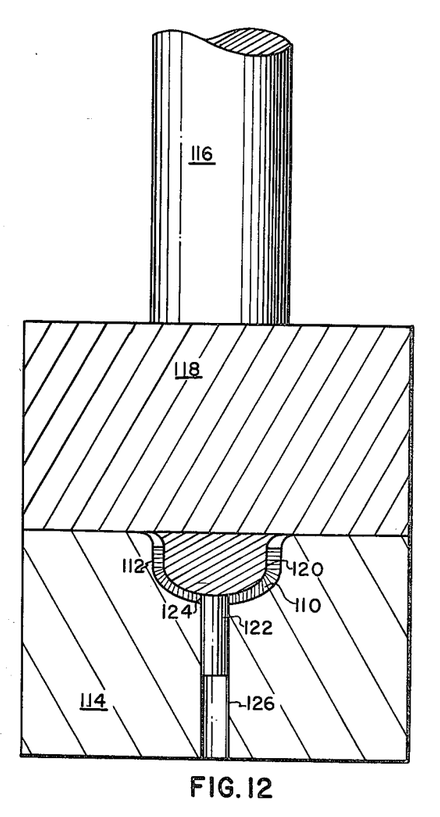
FIG. 12 is a view similar to that of FIG. 11, but showing the punch press closed and the disc formed into shape in the press die concavity.
Figure 13:
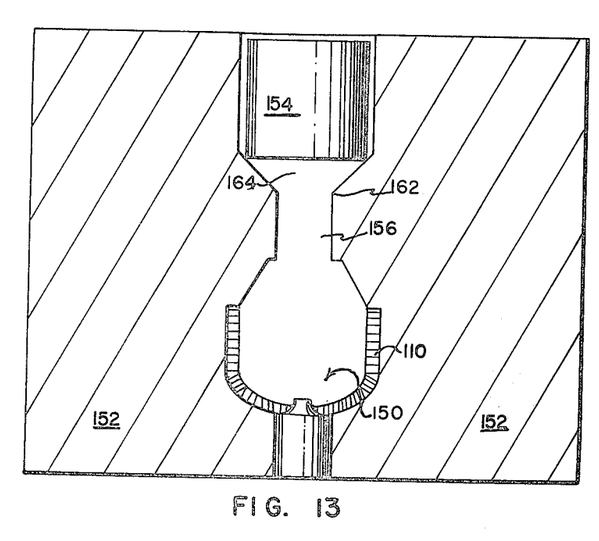
FIG. 13 is a cross-sectional view of the apparatus employed for the present invention when formed by a closed cavity, hot extrusion molding process.

Referring to FIGS. 11, 12 and 13, a circular washer-like segment 110, FIG. 11, is concentrically positioned over concavity 112 of conventional punch press die 114, the cavity having the shape and configuration of the work taction face of the object bit to be formed. Segment 110 is pressed into concavity 112 and shaped by the lowering of press ram 116, upper platen 118 and convex or male die 120; convex die 120 nesting into concavity 112 and punch 122 being passed through central aperture 124 of segment 110 and into orifice 126 of die 114 as shown in FIG. 12.

The pre-formed cup-shaped segment 110 of super-indurate material is next placed into closed cavity die 150, FIG. 13, which is preferably of the split die type 152 as currently employed in closed cavity extrusion molding using high-energy-rate pneumatic-mechanical forming techniques and equipment (not shown) such as the commercial "Dynapak" apparatus. However, appropriate dies in large hydraulic presses will also provide adequate capability for making the object bit.

A heated billet of matrix metal 154, such as steel, iron, nickel, or aluminum is next positioned in the upper part of cavity 150 above neck portion 156 and punch die 158 of punch ram 160 is released under high pneumatic or hydraulic pressure to impact billet 154 at very high pressure, thus causing the metal billet to extrude through neck 156, completely filling cavity 150 and coalescing this extruding metal with super-indurate composite material 110, thus forming the drill bit body into the configuration of the walls of cavity 150 and capping the superficies thereof with the super-indurate composite material 110 to provide the abrasive work taction face of the bit. The drill bit is then removed from the die and finished in a conventional manner by cutting at 162 and removing flared portion 164. Drilling fluid orifice 60, FIG. 10, is bored through the center and coupling shank 56 appropriately threaded to complete the object rock bit.

In the formation of cutting, grinding or abrasive tools which define bodies of revolution, the die may be simultaneously rotated while the metal extrusion is being effected in order to take advantage of centrifugal force to better position the filaments and thus assure increased exactness in collocation and alignment thereof. Further, prior to admixing boron or other super-indurate filaments with the matrix material the former may be pre-coated with a very light magnetic film. Thereafter, conventional application of a magnetic field of force about the compacting die will help assure that the filaments are aligned and collocated with exactness. This magnetic force alignment may be applied during either the cold slurry extrusion or immediately following the admixing of dry metallic powder with super-indurate filaments as heretofore described.

Figure 14:
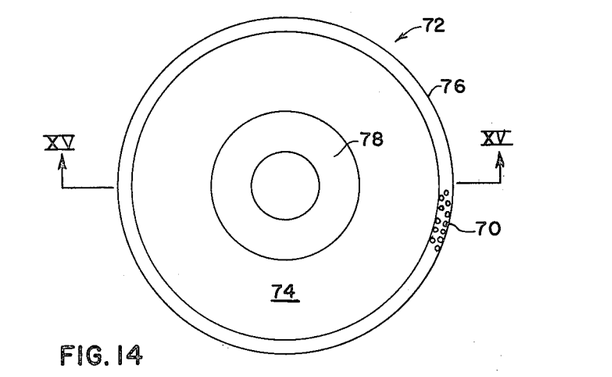
FIG. 14 is a front elevational view of an industrial metal grinding and polishing wheel embodying the present invention.
Figure 15:
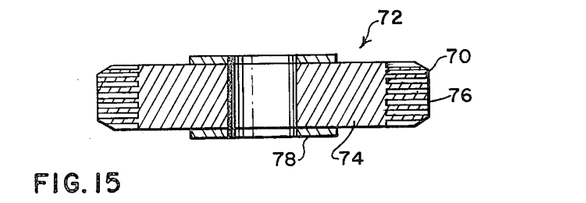
FIG. 15 is a cross-sectional view taken along line XV—XV of FIG. 14.

The grinding wheel shown in FIGS. 14 and 15 is exemplary of abrading tools that may be fabricated to employ super-indurate composites by dry powder metallurgy wherein super-indurate filaments 70 may be aligned and collocated by first applying a magnetic film thereon, admixing with a powdered metal matrix material and subjecting the admixture to a magnetic field while lying uncongealed in the die cavity prior to compaction into a briquette or billet for eventual sintering to form finished wheel 72 having matrix 74 with aligned and collocated super-indurate filaments 70 embodied peripherally therein; the outer ends of which define abrasive surface 76. Conventional bushing or bearing insert 78, subsequently fitted about the central axis completes the construction to provide grinding wheel end product 72.

Figure 16:
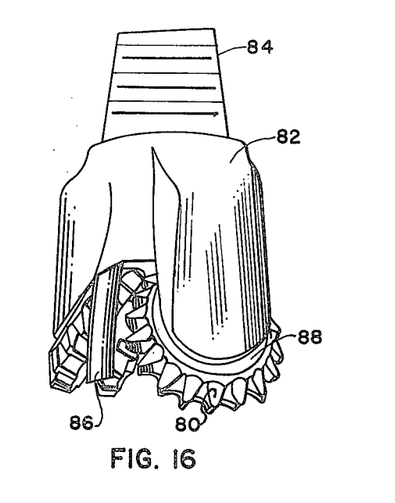
FIG. 16 is a pictorial view of a general purpose oil well roller bit embodying the invention.
Figure 17:
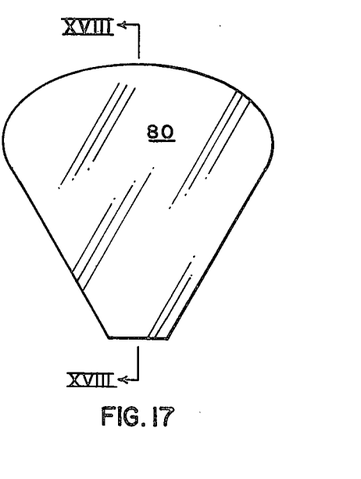
FIG. 17 is an enlarged pictorial detail view of one of the teeth or lug elements of the bit shown in FIG. 16.
Figure 18:
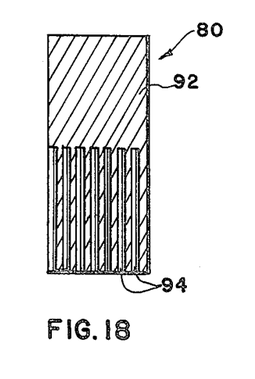
FIG. 18 is a sectional, elevational view taken at line XVIII—XVIII of FIG. 17.

The general purpose drill bit illustrated in FIGS. 16, 17 and 18 may be fabricated in a manner closely correlated to that employed for making the hard rock bit shown in FIG. 9 and generally described above, to embody super-indurate composite material of the present invention in abrasive lugs or teeth 80. Three-legged bit body 82 including threaded coupling shank 84 and drilling fluid nozzle 86 are made of conventional material and are of known construction and thus need not be further described herein.

Cutting tooth or lug 80 is fabricated by the dry powder metallurgy process generally analogous to that described above for making the boring bit insert cutter shown in FIG. 8. Preferably the filaments to be employed are first metallized so that they may be precisely aligned and collocated upon the admixture of metallic matrix powder and these filaments being loosely deposited in the compaction die immediately prior to their compaction into a billet or briquette which is subsequently sintered to finish the tooth. In the second phase of the process teeth or lugs 80 are fitted into notches cut radially into the periphery of a circular positioning plate (not shown) and evenly dispersed thereabout. Only that convergent portion extending downwardly from the tangent point on each shouldered radius protrudes beyond the notches. This protrusion fits snugly into tooth cavities provided in the wall of the closed-end split extrusion die to prevent the former from being covered or damaged by the flow-in of metal during the subsequent extrusion of a billet. With all lugs or teeth 80 being properly spaced and retained by the slotted die ring and also properly disposed with relation to the appropriate die wall cavities, a billet of tough matrix material such as hot steel is extruded into the closed die cavity, much in the manner exemplified in FIG. 13, to cause hot metal to flow into and around the shouldered radii being retained within the slot of the die ring, thereby firmly securing teeth 80 by coalescence with extruding metal and forming rotatable disc element 88, FIG. 16, so that teeth or lugs 80 become an integral part of rotatable disc element 88.

From the foregoing, it will be readily apparent that the present invention is characterized as a super-indurate composite material and method of making same comprising a plurality of super-indurate filaments such as boron and its inter-metallic compounds fixedly embedded in a tough, ductile matrix material and aligned and collocated in such manner that the filament ends and the exposed surface of the matrix provide the cutting edge or abrasive surface of the work taction part of the object tool into which it is shaped, embodied or incorporated.

The present invention encompasses a cutting tool providing in combination, means for attaching the tool to a rotary work producing driving source, a portion of the tool being a matrix material having therein a plurality of super-indurate fiber-like means of crystalline structure each having a length at least several times greater than its thickness and having the characteristic of wearing or breaking along natural cleavage lines to always present a sharp surface at its outer end, thus being selfsharpening. The super-indurate means are essentially boron filaments embedded in the matrix on at least the work surface thereof and oriented to said work surface so that the ends thereof are substantially normal to an object workpiece surface during removal of material from the workpiece.

It will be appreciated from an understanding of the drawings and explanation above, that the boron fibers are held in a metallurgically homogeneous matrix or matrix material as, for example, from the referred to method with incipient fusion of the matrix material, the fibers being dispersed asymmetrically therein close adjacent one another throughout or all over the portion of the matrix adjacent to the external cutting surface portion, that is, in the region of the cutting face, so as to provide an effective cutting and abrading under the extremes of high temperature, pressures and stresses which may be encountered, for example, in the oil well drilling of hard rock substances. The portion of the matrix not adjacent the cutting face, being free of such fibers provides a tough base portion of less hardness than the cutting surface portion as will be evident.

We claim:

1. A self-sharpening cutting tool containing a composite material having exceptionally long wear life for cutting or abrading substances of lapideous-like hardness and capable of superior effectiveness under extremes of temperature and pressures, which comprises a cutting and abrading tool body having a cutting surface portion containing a substantially matrix material of tough, ductile metal selected from the group consisting or iron, aluminum, steel, nickel, cobalt and alloys thereof, said matrix shaped and densified into a structure for providing a cutting or abrading tool, said structure having a cutting surface portion configured with at least one external cutting face suitable for cutting or abrading of rock-hard substances;

a plurality of essentially boron super-indurate fibers having a hardness in the range of 9.3 – 9.99 on the Mohs' hardness scale distributed in said matrix material throughout the cutting surface portion with substantially all of said fibers arranged generally perpendicular to and with ends exposed at said cutting face, each said fiber being of a length at least several times greater than its diameter and each having a crystalline structure such that each fiber has the characteristic of wearing by breaking along planar natural cleavage lines such that each fiber always presents a sharp surface at its outer end so as to be self-sharpening as wear occurs during use;

said fibers being asymmetrically positioned in said structure to present fiber ends over the full cutting face thereof with the average space between fibers being one fiber diameter or less, for effective cutting or abrading;

whereby the cutting face at all times presents towards a substance to be cut or abraded an asymmetrical all-over pattern of self-sharpening, super-indurate fiber ends securely held against displacement by said tough, ductile, metal matrix material even under extremes of high pressure and temperature use conditions.

2. The structure according to claim 1 wherein said cutting surface portion is made up substantially of approximately 30% by volume, or greater of said fibers in said range of hardness.

3. The self-sharpening cutting tool of claim 1 in which said matrix material is a sintered metal produced by incipient fusion of compacted metal granules heated to a temperature less than a melting temperature for the metal of said matrix material.

4. A self-sharpening cutting tool containing a plurality of super-indurate filament-like cutting means and effective under the heat and pressure conditions attendant to earth removing operations comprising:

a tool body having a tough, ductile, metal matrix material containing a plurality of closely spaced super-indurate filamentary cutting means therein;

at least a portion of said tool body adapted for attachment to a work producing driving source and having a work or cutting surface;

said super-indurate cutting means each having a length at least several times greater than its thickness, being within the hardness range of 9.3 to 9.9 on the Mohs hardness scale and having a crystalline structure such that it has the characteristic of wearing by breaking along natural cleavage lines to always present a sharp surface at its outer end;

said super-indurate cutting means embedded in said matrix on at least the cutting surface thereof and oriented to said cutting surface so that the outer ends of said cutting means are generally normal to an object workpiece surface during removal of material therefrom by cutting or abrading action of the cutting tool;

said cutting means making up about 30 percent of the total cutting surface of the cutting tool.

5. The self sharpening cutting tool of claim 4 in which a portion of said matrix is substantially devoid of said fibers whereby such portion has a lower modulus than the portion having fibers to facilitate its attachment to a driving source.

* * * * *